CYCLOALKENE DIOL

Pierre Lafont, Lyon, and Henri Menand, St.-Fons, France, assignors to Rhone-Poulenc S.A., Paris, France, a French body corporate
No Drawing. Filed Apr. 5, 1962, Ser. No. 185,211
Claims priority, application France, Apr. 14, 1961, 858,800, Patent 1,294,313
1 Claim. (Cl. 260—617)

This invention relates to a cycloalkene diol and more pariculary to cyclooct-5-ene-1,2-diol and its production.

Trans-cyclooctane-1,2-diol may be prepared by reacting cis-1,2-epoxycyclooctane with water at elevated temperature and under high pressure in the presence of basic substances such as, for example, alkali or alkaline-earth hydroxides, as described in published German patent application No. 1,070,628.

It is known that when cis-1,2-epoxycyclooctane is reacted with acid compounds, such as formic, acetic and trihaloacetic acids, either no trans-cyclooctane-1,2-diol is obtained or it is obtained in only very small yield, owing to side reactions which give rise to the predominant formation of cis-cyclooctane-1,4-diol, cyclooct-3-ene-1-ol and cyclooct-4-ene-1-ol [A.C. Cope et collab. J. Am. Chem. Soc., vol 81, pp. 1640-2 (1959)].

According to a first feature of the present invention there is provided, as a new chemical compound, cyclooct-5-ene-1,2-diol, a substance boiling at 153–155° C. under a pressure of 16 mm. mercury.

According to a second feature of the invention there is provided a process for the production of cyclooct-5-ene-1,2-diol which comprises subjecting cis-1,2-epoxycyclooct-5-ene to treatment with a mineral or organic acid. The desired diol is obtained in excellent yield, and this result is surprising since it was normally to be expected that the side reactions would be preponderant, by analogy to the results found when starting with cis-1,2-epoxycyclooctane.

Preferably the process of the invention is carried out by heating cis-1,2-epoxycyclooct-5-ene at a temperature of 20° to 150° C. with a mineral or organic acid for one to several hours. Suitable mineral acids are, for example, hydrochloric, sulphuric, phosphoric or perchloric acid. Suitable organic acids are, for example, formic acid, acetic acid and its halo-substituted derivatives, and higher homologues of such acids When mineral acids are employed the reaction may be conveniently carried out either with the reactants in emulsion or in the presence of water and optionally of a diluent which is inert to the reactants and immiscible with water, such as diethyl ether, chloroform or benzene, or in solution, by substituting for the inert diluent an inert solvent for the epoxide which is miscible with water, for example dioxan. The acid concentration in the reaction medium may vary within wide limits. For example, in the case of perchloric acid, a concentration of from 0.5% to 5% is particularly suitable.

Where organic acids are employed, it is also possible to operate either with the acid alone or in the presence of an inert solvent, for example diethyl ether, chloroform or benzene. The organic acids are then preferably employed in concentrated form, for example crystallisable formic acid or glacial acetic acid.

After reaction of the 1,2-epoxycyclooct-5-ene with the acid compound, the reaction mass is neutralised or, where an organic acid has been used, subjected to saponification, and the organic fraction is extracted with a solvent, for example diethyl ether. The cyclooct-5-ene-1,2-diol is separated from the ether extract by distillation.

The cis-1,2-epoxycyclooct-5-ene employed as starting material in the process of the invention is a known compound [A.C. Cope et coll. J. Am. Chem. Soc., vol. 82, p 6368 (1960)] It may be obtained in good yields by reacting acetaldehyde peracetate with cis-cis-cycloocta-1,5-diene in solution in ethyl acetate It is known that cis-cis-cycloocta-1,5-diene is obtainable by dimerisation of butadiene.

Cyclooct-5-ene-1,2-diol may be hydrogenated to give cyclooctane-1,2-diol, which serves as starting material in the preparation of suberic acid, which can be used for the preparation of polyamides.

The following examples, in which the parts and percentages are by weight, will serve to illustrate the invention:

Example I

Into a spherical flask are introduced:

5000 parts of water
76.9 parts of 65% perchloric acid
620 parts of cis-1,2-epoxycyclooct-5-ene.

The mixture is vigorously stirred and heated at 60° C. for 4½ hours and the reaction mass is then cooled, neutralised by the addition of 1000 parts of an 0.5 N aqueous sodium hydroxide solution, extracted with 4×2000 parts of diethyl ether, and the ethereal solution dried over anhydrous sodium carbonate and then distilled. There are thus obtained:

500 parts of a middle fraction, B.P. 153–155° C./16 mm. Hg, in the form of a colourless liquid which does not crystallise, and 60 parts of pale yellow resinous residue.

By elemental analysis, hydrogenation and titration with periodic acid it is shown that the middle fraction is cyclooct-5-ene-1,2-diol. This diol has a bis-phenylurethane derivative which melts at 178–180° C. The yield is about 71%.

1,2-epoxycyclooct-5-ene may be prepared by the reaction of 866 parts of cis-cis-cycloocta-1,5-diene with 1500 parts of a 33% acetaldehyde peracetate solution in ethyl acetate, the operation being carried out at 70° C. under a vacuum of 80–90 mm. Hg. On distillation, 362 parts of cis-1,2-epoxycyclooct-5-ene are obtained (yield 73% on the acetaldehyde peracetate employed).

Example II

A spherical flask is charged with:

840 parts of crystallisable formic acid, which is heated to 60° C. A solution of 454 parts of cis-1,2-epoxycyclooct-5-ene in 800 parts of diethyl ether is run in, with stirring, during 1 hour, and the stirring is maintained for three further hours with the temperature at 60° C. After this time the mixture is cooled, 5000 parts of 20% aqueous sodium hydroxide solution are added, and the mixture is refluxed for 6 hours. The organic fraction is then extracted with diethyl ether, the ether is driven off by evaporation in vacuo and the product is dried over anhydrous sodium carbonate and then distilled. There are thus obtanied:

350 parts of a middle fraction boiling at 150–154° C. under 16 mm. Hg and containing 92.5% of cyclooct-5-ene-1,2-diol, and
70 parts of pale yellow residue.

The yield of the desired diol is therefore 67.2%.

Example III

A sperical flask is charged with:

621 parts of cis-1,2-epoxycyclooct-5-ene and there are then added, during about 30 minutes, 600 parts of glacial acetic acid, the operation being carried out at ambient temperature (about 20° C.). The mixture is then heated to 100° C. and maintained at this temperature for 24 hours. It is then allowed to cool, 3000 parts of aqueous 20% sodium hydroxide solution are added and the mixture is stirred for 24 hours at room temperature. After extraction of the organic fraction with ether, drying the ether extracts over anhydrous sodium carbonate and distillation in vacuo, there are obtained:

300 parts of a fraction boiling at 153–155° C. under 15 mm. Hg and containing 87.1% of cyclooct-5-ene-1,2-diol, and
300 parts of orange-coloured residue.

The yield of diol was therefore 42.2%.

We claim:

Process for the production of cyclooct-5-ene-1,2-diol which comprises treating cis-1,2-epoxycyclooct-5-ene in the presence of water with perchloric acid at a temperature of 20–150° C., neutralizing the resulting mixture, and separating the resultant diol by distillation.

References Cited by the Examiner

Cope et al.: J. Am. Chem. Soc., vol. 81, pages 1640–42 (1959).

Cope et al.: J Am. Chem. Soc., vol. 82, pp. 6366–69 (1960).

Rowland et al.: J. Am. Chem. Soc., vol. 82, pages 2833–36 (1960).

JOSEPH R. LIBERMAN, *Primary Examiner.*

LEON ZITVER, *Examiner.*

M. B. ROBERTO, T. G. DILLAHUNTY,
*Assistant Examiners.*